Sept. 28, 1954     A. B. GUISE     2,690,229
APPARATUS FOR RELEASING FIRE-EXTINGUISHING DRY CHEMICALS
Original Filed Jan. 31, 1951
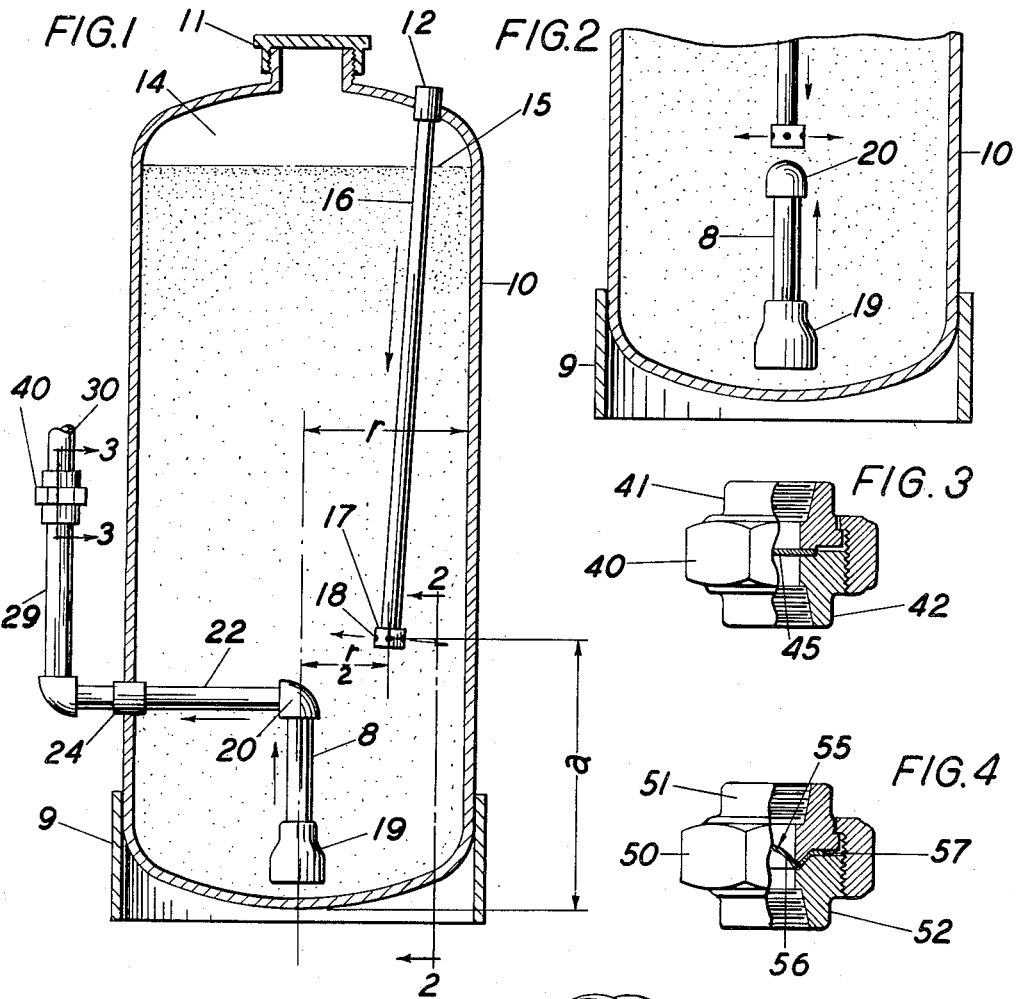
INVENTOR.
ARTHUR B. GUISE
BY Joseph Rossman
ATTORNEY

Patented Sept. 28, 1954

2,690,229

UNITED STATES PATENT OFFICE 2,690,229

APPARATUS FOR RELEASING FIRE-EXTINGUISHING DRY CHEMICALS

Arthur B. Guise, Marinette, Wis., assignor to Ansul Chemical Company, Marinette, Wis., a corporation of Wisconsin Original application January 31, 1951, Serial No. 208,825. Divided and this application May 18, 1953, Serial No. 355,587

4 Claims.  (Cl. 169—11)

This invention relates to an apparatus for controlling the release of dry chemical powder from fire-extinguishing apparatus to obtain greater fire-extinguishing effectiveness.

This application is a division of copending application Serial No. 208,825, filed January 31, 1951.

In gas pressure-type dry chemical powder fire-extinguishing equipment, the fluidizing and expellant gas is frequently stored separately and admitted to the chamber containing a dry chemical powder only when the apparatus is to be used. If the conduit leading from the dry chemical chamber is open at the time the gas is admitted to the dry chemical powder chamber, a considerable portion of the fluidizing and pressurizing gas is lost through this conduit, resulting in an undesirable ratio of dry chemical powder to expellant gas and an undesirably low rate of flow of dry chemical powder. By delaying the release of the dry chemical powder in fluidized form from the dry chemical powder chamber until the dry chemical powder has been fluidized and a predetermined pressure reached in the dry chemical powder chamber, a desirable ratio of dry chemical powder to expellant gas is obtained and an equally desirable rate of flow of dry chemical powder is maintained.

The proper control of the rate of flow of dry chemical powder is essential to the successful operation of dry chemical powder fire-extinguishing systems where the conduit from the dry chemical powder chamber leads to one or more open nozzles connected by properly designed piping to operate automatically in case of a fire. The flow of dry chemical from a dry chemical powder chamber without the necessary delay in release of the dry chemical powder until the pressure has reached a satisfactory predetermined point results in variations in the rate of flow with possible deleterious results on the fire-extinguishing effectiveness of such a system. The means provided by this invention permits the installation of automatically operated dry chemical powder piped systems which will furnish reliable fire protection. The same means can also be applied to manually operated equipment wherein either pipe lines with fixed nozzles or hose lines with manually operated nozzles are used. In all cases the use of this invention in dry chemical powder fire-extinguishing equipment will provide more reliable fire protection.

According to the present invention the dry chemical is fluidized and pressurized to a predetermined pressure in a closed chamber. The chamber is connected to a conduit for conveying the fluidized dry chemical therefrom. Delay in the release of the dry chemical from the dry chemical powder chamber is attained by using a normally closed automatically operated valve or other means, such as a bursting disc, to ensure that the pressure reaches the desired predetermined value before the dry chemical powder is released from the dry chemical powder chamber.

Further advantages and details of the invention will be apparent from the following specification and drawings, wherein Figure 1 is an elevational view, partly in section, of a fire-extinguishing apparatus embodying the novel features of this invention, Figure 2 is a view taken on lines 2—2 of Figure 1.

Figure 3 is an enlarged partial sectional view taken on lines 3—3 of Figure 1, showing the dry chemical conduit provided with a flat frangible bursting disc or rupture diaphragm.

Figure 4 is an enlarged partial sectional view of a modified construction of a concavely shaped frangible bursting disc in the dry chemical conduit, and Figure 5 is an exploded fragmental perspective view of the retaining elements and the frangible bursting disc construction shown in Figure 4.

Referring to the Figures 1 to 4 of the drawings, the fire-extinguishing apparatus comprises a steel cylindrical storage container 10 for storing powdered dry chemical therein, such as disclosed in Patent 1,793,420, February 17, 1931, to the level 15 leaving a relatively small empty space 14 at the upper end of the container 10. The container has a smooth concave bottom surface merging with the vertical walls thereof. The container is supported by a base 9 and is provided at the top with a removable closure cap 11 for introducing fresh dry chemical into the container.

A gas inlet 12 is provided at the top of the container which is adapted to be suitably connected to a source of gas pressure, such as cylinders of compressed carbon dioxide, nitrogen or air which may be under pressure of about 2000 lbs. per square inch. The inlet 12 is connected to a tube 16 extending within the container and terminating at a distance $a$ which is approximately ⅓ of the total height of the container from the bottom. The tube 16 terminates with a cap 17 having a plurality of orifices 18 whose axes are substantially perpendicular to the axis of the tube and whose purpose is to diffuse the gaseous stream, as covered in copending application Serial No. 208,821, filed January 31, 1951, now Patent No. 2,651,373, September 8, 1953. This construction avoids diluting the expellant stream of dry chemical beyond a predetermined minimum value so as not to substantially alter the desired ratio of dry chemical to gas in the expellant stream.

An inwardly flared outlet 19 is provided adjacent the bottom of the container for entry therein of fluidized dry chemical. The outlet 19 is connected by a short pipe 8 to an elbow 20 which is connected to pipe 22. Pipe 22 is connected to outlet 24 in the vertical wall of the chamber 10. Conduit 29 is connected to outlet 24. The upper end of conduit 29 is threaded to receive a fitting 42 which supports a frangible relatively thin flat diaphragm 45 made of any suitable material such as ductile sheet metal. The diaphragm 45 is retained at its margins by a cooperating collar 41 retained in gas-tight engagement by coupling 40. Collar 41 is internally threaded at its upper end and is connnected to a pipe 30. It will be noted that the diaphragm 45 is located in conduit 29 which is offset from the chamber 10 so that no dry chemical in chamber 10 is in contact with the diaphragm 45 until the chamber is pressurized. In my construction the weight of the dry chemical before fluidization is not supported by the diaphragm 45 and the diaphragm is not ruptured until all the dry chemical is full fluidized as previously explained.

In operation, container 10, being substantially filled with powdered dry chemical, is suitably connected at its inlet 12 to a supply of compressed gas, such as nitrogen for example, at about 2000 lbs. per square inch pressure. The gas will be conducted through the tube 16 to the lower portion of the container and the stream will be diffused into a plurality of streams which will be emitted in radial directions through orifices 18 against the lateral walls of the container. The emitted gas will force a path through the dry chemical to the top of the container fluidizing the dry chemical and at the same time pressurizing the upper and lower regions of the container at about the same rate. As additional gas is admitted to the container, the fluidized dry chemical will be forced to enter the flared outlet 19 and travel upwardly in a path substantially parallel to the vertical axis of the container until it reaches elbow 20 and then enters pipe 22 and leaves through conduit 29. When the pressure in chamber 10 reaches a predetermined value, as for example 200 to 250 lbs. per square inch, the diaphragm 45 will be automatically ruptured and the fluidized stream of dry chemical will then freely flow into supply conduit 30. Instead of using a flat frangible diaphragm in conduit 29, I may substitute a shaped frangible relatively thin diaphragm 55, as shown in Figures 4 and 5, provided with a convexly or dome-shaped diaphragm portion 56 having its inner or concave surface presented to the interior of conduit 29. Diaphragm 55 is provided with a flange portion 57 which is retained by members 51 and 52 coupled together by a coupling 50, as shown in Figure 4. Inasmuch as the frangible diaphragm is made of flexible and ductile material, it will burst when a predetermined pressure is attained in chamber 10, but it will not fragmentate and no particles or pieces thereof will enter into conduit 30 with the stream of fluidized dry chemical which obviously would be undesirable as any nozzles or valves in conduit 30 might otherwise be obstructed by any fragments.

The frangible diaphragm can be readily replaced after the entire content of chamber 10 has been emptied. It will also be apparent that when the frangible diaphragm bursts at a predetermined pressure, it will instantly and rapidly open conduit 29 without obstructing the flow of the fluidized dry chemical stream so that the conduit 29 is fully and quickly opened to its maximum capacity.

From the foregoing description it will be seen that the present invention provides an effective dry chemical fire-extinguishing apparatus which supplies a fluidized stream of dry chemical having a substantially constant predetermined ratio of dry chemical to expellant gas. The dry chemical is first fluidized in a closed chamber by supplying fluidizing gas thereto and additional gas under pressure is admitted to the chamber in such manner as to pressurize all portions of the chamber at substantially the same rate. The dry chemical chamber is connected to a dry chemical conduit which is normally closed by a frangible diaphragm which is ruptured only when the pressure in the chamber reaches a predetermined pressure.

Numerous changes and modifications may be made in the details of the invention previously described which are intended to be included within the scope of the appended claims.

I claim:

1. Fire-extinguishing apparatus for releasing dry chemical powder which comprises a closed chamber for retaining dry chemical powder, means to admit gas under pressure to said closed chamber for fluidizing said dry chemical within said closed chamber and to increase the pressure within said closed chamber, a supply conduit connected to a vertical wall of said closed chamber for conveying said fluidized dry chemical therefrom, a rupturable diaphragm positioned in said conduit for closing same and spaced from the said vertical wall of said closed chamber and being rupturable for releasing the fluidized dry chemical powder from said chamber only when a predetermined pressure is attained in said chamber.

2. Fire-extinguishing apparatus for releasing dry chemical powder which comprises a closed chamber for retaining dry chemical powder, means to admit gas under pressure to said closed chamber for fluidizing said dry chemical within said closed chamber and to increase the pressure within said closed chamber, and a supply conduit connected to a vertical wall of said closed chamber for conveying said fluidized dry chemical therefrom, said conduit means being closed by a frangible diaphragm having its face in a substantially horizontal plane and spaced from the said vertical wall of said closed chamber and being rupturable when a predetermined pressure is attained in said chamber.

3. Fire-extinguishing apparatus for releasing dry chemical powder which comprises a closed chamber for retaining dry chemical powder, means to admit gas under pressure to said closed chamber for fluidizing said dry chemical within said closed chamber and to increase the pressure within said closed chamber, and a conduit connected to a vertical wall of said closed chamber for conveying said fluidized dry chemical therefrom, said conduit means being closed by a frangible substantially flat ductile metal diaphragm having its face in a substantially horizontal plane and spaced from the said vertical wall of said closed chamber and being rupturable when a predetermined pressure is attained in said chamber.

4. Fire-extinguishing apparatus for releasing dry chemical powder which comprises a closed chamber for retaining dry chemical powder, means to admit gas under pressure to said closed chamber for fluidizing said dry chemical within said closed chamber and to increase the pressure within said closed chamber, and a conduit connected to a vertical wall of said closed chamber for conveying said fluidized dry chemical therefrom, said conduit means being closed by a frangible dome-shaped ductile metal diaphragm having its face in a substantially horizontal plane and spaced from the said vertical wall of said closed chamber and being rupturable when a predetermined pressure is attained in said chamber.

References Cited in the file of this patent

UNITED STATES PATENTS

| Number | Name | Date |
|---|---|---|
| 1,169,646 | Jaretzki | Jan. 25, 1916 |